US012627561B2

(12) United States Patent
Pathak et al.

(10) Patent No.: US 12,627,561 B2
(45) Date of Patent: May 12, 2026

(54) SYSTEM AND METHOD FOR NETWORK SLICE SUBNET DISTRIBUTION

(71) Applicant: Rakuten Mobile, Inc., Tokyo (JP)

(72) Inventors: Mihir Pathak, Tokyo (JP); Jyoti Bose, Tokyo (JP); Jithin Chathankandath, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 209 days.

(21) Appl. No.: 18/252,041

(22) PCT Filed: Jan. 24, 2023

(86) PCT No.: PCT/US2023/011394
§ 371 (c)(1),
(2) Date: May 8, 2023

(87) PCT Pub. No.: WO2024/158382
PCT Pub. Date: Aug. 2, 2024

(65) Prior Publication Data
US 2025/0080418 A1      Mar. 6, 2025

(51) Int. Cl.
*H04L 41/0823* (2022.01)
*H04L 41/0895* (2022.01)

(52) U.S. Cl.
CPC ...... *H04L 41/0836* (2013.01); *H04L 41/0895* (2022.05)

(58) Field of Classification Search
None
See application file for complete search history.

(56) References Cited

U.S. PATENT DOCUMENTS

| | | | | |
|---|---|---|---|---|
| 11,706,093 B2 * | 7/2023 | Kushwaha | ............ | H04L 47/805 709/223 |
| 2021/0185695 A1 * | 6/2021 | Gupta | .................. | H04W 28/16 |
| 2021/0409977 A1 * | 12/2021 | Dussmann | .............. | H04L 45/66 |

FOREIGN PATENT DOCUMENTS

WO      WO-2019210946 A1 *  11/2019

OTHER PUBLICATIONS

"SmartM2M; IoT over Cloud back-ends: A Proof of Concept", ETSI Technical Report, European Telecommunications Standards Institute (ETSI), 650, Route Des Lucioles ; F-06921 Sophia-Antipolis ; France, vol. SmartM2M, No. V1.1.1 Aug. 1, 2018 (Aug. 1, 2018), pp. 1-21, XP014329242,. Retrieved from the Internet: URL:http://www.etsi.org/deliver/etsi_tr/103500_103599/103529/01.01.01_60/tr_103529v010101p.pdf [retrieved on Aug. 1, 2018], 21pp.

* cited by examiner

*Primary Examiner* — Mohamed Ibrahim
(74) *Attorney, Agent, or Firm* — HAUPTMAN HAM, LLP

(57) ABSTRACT

A method including determining, by a processor, whether a processing load on one or more network slice subnet management functions (NSSMFs) has exceeded a predetermined processing limit; and determining, by the processor, which processing load on the one or more NSSMFs has exceeded the predetermined processing limit; and implementing, by the processor, based on the processing load that exceeded the predetermined processing limit, an additional NSSMF for each NSSMF that exceeded the predetermined processing limit.

21 Claims, 12 Drawing Sheets

200

202 Receive input to begin slice design

204 Present slice templates

206 Receive slice template selection

208 Receive slice information

210 Display service profile SLA parameters

212 Receive domain specific network service

214 Receive SLA monitoring parameters

216 Display designed network slice

218 Deploy designed network slice

220 Update status of network slice

500

Closer to Edge for Low
Latency Use Cases

More Load
More Processing of Subnets

Less Load
Less Processing Time

SYSTEM AND METHOD FOR NETWORK SLICE SUBNET DISTRIBUTION

RELATED APPLICATIONS

The present application is a National Phase of International Application No. PCT/US2023/011394, filed Jan. 24, 2023

TECHNICAL FIELD

This description relates to a system for network slice subnet distribution and method of using the same.

BACKGROUND

A cellular network is a telecommunication system of mobile devices (e.g., mobile phone devices) that communicate by radio waves through one or more local antenna at a cellular base station (e.g., cell tower). The coverage area in which service is provided is divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provides connection with a core network (CN). Depending on the standard, mobile phones and other wireless connected devices are varyingly known as user equipment (UE), terminal equipment (TE), mobile station (MS), and the like.

SUMMARY

In some embodiments, a method including determining, by a processor, whether a processing load on one or more network slice subnet management functions (NSSMFs) has exceeded a predetermined processing limit; and determining, by the processor, which processing load on the one or more NSSMFs has exceeded the predetermined processing limit; and implementing, by the processor, based on the processing load that exceeded the predetermined processing limit, an additional NSSMF for each NSSMF that exceeded the predetermined processing limit.

In some embodiments, an apparatus, including a processor; and a memory having instructions stored thereon that, when executed by the processor, cause the apparatus to determine whether a processing load on one or more network slice subnet management functions (NSSMFs) has exceeded a predetermined processing limit; and determine which service has exceeded the predetermined processing limit; and implement an additional NSSMF for each NSSMF that exceeded the predetermined processing limit.

In some embodiments, a non-transitory computer readable medium having instructions stored thereon that, when executed by a processor, cause the apparatus to determine whether a processing load on one or more network slice subnet management functions (NSSMFs) has exceeded a predetermined processing limit; and determine which processing load on the one or more NSSMFs has exceeded the predetermined processing limit; and implement, based on the processing load that exceeded the predeterminer processing limit, an additional NSSMF for each NSSMF that exceeded the predetermined processing limit.

BRIEF DESCRIPTION OF THE DRAWINGS

Aspects of the embodiments are understood from the following detailed description when read with the accompanying Figures. In accordance with the standard practice in the industry, various features are not drawn to scale. In some embodiments, dimensions of the various features are arbitrarily increased or reduced for clarity of discussion.

DETAILED DESCRIPTION

Figure 1:
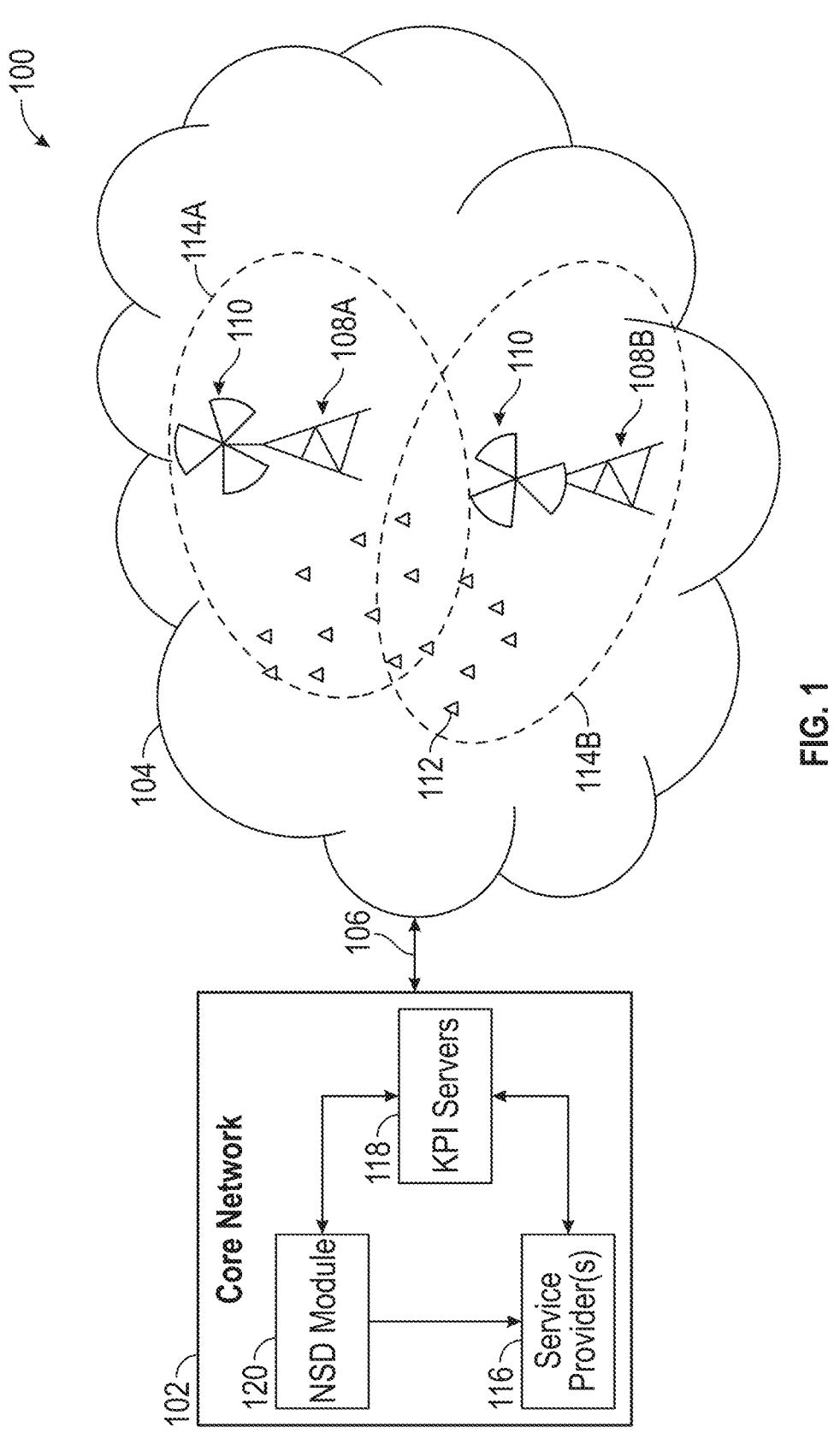
FIG. 1 is a diagrammatic representation of a system for network slice design (NSD), in accordance with some embodiments.

The following provides many different embodiments, or examples, for implementing distinctive features of the discussed subject matter. Examples of components, values, operations, materials, arrangements, or the like, are described below to simplify the present disclosure. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the Figures. The spatially relative terms are intended to encompass different orientations of the device in use or operation in addition to the orientation depicted in the Figures. In response to the apparatus being otherwise oriented (e.g., rotated 90 degrees or at other orientations), the spatially relative descriptors used herein likewise are interpreted accordingly.

Network slicing is a method of creating multiple unique logical and virtualized networks over a common multi-domain infrastructure. Using software-defined networking (SDN), network function virtualization (NFV), orchestration, analytics, and automation, network operators manually create network slices that support a specific application, service, set of users, or network. Network slices are able to be configured to span multiple network domains, such as an access networks (a user network, such as a RAN, that connects subscribers to a service provider and, through the transport network, to other networks such as the Internet), a CN (the core network is a central conduit designed to transfer network traffic at high speeds), and a transport network (TN) (the public telecommunications infrastructure which permits telecommunications between and among defined network termination points) deployed across multiple network operators.

Network slicing supports services with varying network requirements, such as a connected vehicle to a voice call, which requires different throughput, latency, and reliability compared to data communication with internet of things (IOT) devices. With network slicing, each slice is configured to have a different architecture, management, and security to support a particular use. While functional components and resources are shared across network slices, capabilities such as data speed, capacity, connectivity, quality, latency, reliability, and services are customized in each slice to conform to a specific service level agreement (SLA) with a vendor.

A network slice is broken up into network service subnets (NSS) where each subnet is dedicated to a domain (e.g., RAN, CN, transport domain (e.g., TN), or end-to-end (E2E) that includes each domain). The transport domain references the telecommunication transmission facilities under which voice, data, and video communications are distributed between distant locations for use on a shared basis.

Within a NSS is one or more network services. For example, within a RAN slice subnet is a network service, such as gnodeB (gNB is a third-generation partnership project (3GPP) 5G next generation base station which supports 5G new radio (NR)). Within a CN slice subnet is a network service, such as NRF (a network repository function which is a function of the 3GPP service-based architecture (SBA) for 5G CNs acting as a central services broker for all network functions (NFs) in the 5G CN) or AMF (access and mobility management function that receives connection and session related information from the UE for handling connection and mobility management tasks). Within a transport slice subnet is a TN service.

In some embodiments, a distribution manager for NSSs is discussed. In some embodiments, a method for managing NSS distribution is discussed.

With regards to other approaches for slice management, other approaches integrate with NSSs in each domain (e.g., RAN, CN and TN), which is controlled by a centralized subnet manager. This integration causes problems during scaling of the subnets (e.g., due to increase in load (a measure of the amount of computational work that a computer system performs)) as the entire centralized subnet manager is scaled.

In software defined networking (SDN), southbound interfaces are the OpenFlow protocol specification that enables communication between controllers, switches, and other network nodes, which are with lower-level components. This further lets the router identify network topology, determine network flows, and implement requests sent to the router via northbound interfaces. A northbound interface includes an interface that lets a specific component communicate with a higher-level component in the same network.

As other approaches are tightly coupled with the subnets taken as a whole, these other approaches are unable to be scaled on a per subnet basis and are further unable to integrate with multiple southbound services. The other approaches are unable to handle subnet-specific loads which vary according to the region where the subnets are deployed. Furthermore, these other approaches are unable to support multiple subnet configuration service integration for a configuration push. A push configuration is a feature that supports configuration management across an enterprise where a new configuration is pushed from a running configuration on a source system to a running configuration on one or more target systems.

In some embodiments, a network slice subnet management function (NSSMF) ensures that the behavior of the RAN, CN, and TN domains are abstracted and controlled with a deployment strategy. In some embodiments, the NSSMF operates in any combination of RAN, CN, TN, all three together, or individually.

In some embodiments, the subnet layer and the cloud management as a service (CMaaS)/software defined network controller (SDNC)/subnet configuration service are decoupled and provide a vendor the ability to choose services to be integrated into the NSSMF for configuring the subnet.

CMaaS is the management of cloud computing products and services. Public clouds are managed by public cloud service providers, which include the public cloud environment's servers, storage, networking, and data center operations. Users opt to manage their public cloud services with a third-party cloud management tool. Managing a private cloud involves software tools to help create a virtualized pool of compute resources, provide a self-service portal for end users and handle security, resource allocation, tracking and billing. Management tools for private clouds tend to be service driven, as opposed to resource driven, because cloud environments are typically highly virtualized and organized in terms of portable workloads. In hybrid cloud environments, compute, network, and storage resources are managed across multiple domains.

The SDNC is a logically centralized entity in charge of (i) translating the requirements from the SDN application layer down to the SDN data paths and (ii) providing the SDN applications with an abstract view of the network (which includes statistics and events). An SDNC includes one or more northbound interface (NBI) agents, the SDN control logic, and the control to data-plane interface (CDPI) driver. Description as a logically centralized entity neither prescribes nor precludes implementation details such as the federation of multiple controllers, the hierarchical connection of controllers, communication interfaces between controllers, nor virtualization or slicing of network resources.

Subnetting is the practice of dividing a network into smaller networks. Subnetting increases routing efficiency, which helps to enhance the security of the network and reduces the size of the broadcast domain. Internet protocol (IP) subnetting designates high-order bits from the host as part of the network prefix. This method divides a network into smaller subnets. IP subnetting further reduces the size of the routing tables, which are stored in routers.

In some embodiments, each deployment of NSSMF is of one or more of the following deployment types: a single NSSMF for the CN/RAN/TN combined, a NSSMF for the CN/RAN combined and separate NSSMF for the TN, a NSSMF for the TN/RAN combined and separate NSSMF for the CN, a NSSMF for the CN/TN combined and separate NSSMF for the RAN, or a separate NSSMF for the RAN, TN, and CN individually.

In some embodiments, a user switches to a deployment based on a networks load. In some embodiments, NSSMF is configured with a multi-vendor subnet configuration SPI (SPI is an acronym for cloud service delivery models that are generally of three varieties: Software-as-a-Service (Saas is the capability provided to a user to use the provider's applications running on a cloud infrastructure and accessible from various client devices through either a thin client interface, such as a web browser (e.g., web-based email), or a program interface), Platform-as-a-Service (PaaS is the capability provided to the user to deploy onto the cloud infrastructure user-created or acquired applications created using programming languages, libraries, services, and tools supported by the provider where the user does not manage or control the underlying cloud infrastructure including network, servers, operating systems, or storage, but has control over the deployed applications and possibly configuration settings for the application-hosting environment) and Infrastructure-as-a-Service (IaaS is the capability for the user to deploy and run arbitrary software, which includes operating systems and applications where the user does not manage or control the underlying cloud infrastructure but has control over operating systems, storage, and deployed applications; and possibly limited control of select networking components)).

In some embodiments, a technical solution is based on scaling, in or out, the load of individual subnets. Thus, maintenance and operation of subnets is more efficient.

In some embodiments, a NSSMF includes several components, such as subnet adaptors (e.g., CN, RAN, and TN) and a configuration manager that connects to a configuration service to push configurations for network functions.

In some embodiments, individual NSSMF subnet adaptors are switched on based on deployment and dependent on the slice subnet load the NSSMF subnet adaptor is managing (e.g., CN-RAN-TN, CN-RAN, TN-RAN, CN-TN or RAN, TN, CN individually). In some embodiments, a user switches to any of the combinations (e.g., CN-RAN-TN, CN-RAN, TN-RAN, CN-TN or RAN, TN, CN individually) thus, handling greater load with increased efficiency.

In some embodiments, the configuration manager generates configuration files that push configurations and connection structures to the configuration services that push configurations to the network functions. In some embodiments, multiple configuration options are supported. In some embodiments, a user switches on a particular service for a configuration push mechanism. Thus, making more options available for the user to configure network functions as there are multiple protocols, such as Network Configuration Protocol (Netconf), representational state transfer (REST), g remote procedure calls (GRPC), which are supported by the network functions (NFs) and the configuration service. Thus, providing flexibility for the user to choose from the many supported configuration services.

NETCONF is a network management protocol developed and standardized by the internet engineering task force (IETF). NETCONF provides mechanisms to install, manipulate, and delete the configuration of network devices. NETCONF's operations are realized on top of a simple Remote Procedure Call (RPC) layer. The NETCONF protocol uses an Extensible Markup Language (XML) based data encoding for the configuration data as well as the protocol messages. The protocol messages are exchanged on top of a secure transport protocol. The NETCONF protocol is implemented in network devices such as routers and switches by equipment vendors. NETCONF supports robust configuration change using transactions involving several devices.

REST is a software architectural style that describes a uniform interface between physically separate components, often across the Internet in a client-server architecture. REST defines four interface constraints (1) identification of resources, (2) manipulation of resources, (3) self-descriptive messages, and (4) hypermedia as the engine of application state. Generally, REST describes a machine-to-machine interface. In web development REST allows content to be rendered when it is requested, often referred to as dynamic content.

GRPC (a recursive acronym) is a cross-platform open-source high performance RPC framework. GRPC, is used to power use cases from microservices to the "last mile" of computing (mobile, web, and Internet of Things). GRPC uses HTTP/2 for transport, Protocol Buffers as the interface description language, and provides features such as authentication, bidirectional streaming and flow control, blocking or nonblocking bindings, and cancellation and timeouts. Most common usage scenarios include connecting services in a microservices style architecture or connecting mobile device clients to backend services.

In some embodiments, use case deployment strategies include moving a NSSMF closer to CMaaS deployment locations for RAN and the CN for maintaining sessions. In some embodiments, a NSSMF is flexible and plug and play capable. In some embodiments, NSSMF handles higher loads and is capable of being deployed closer to CMaaS near the network functions, which is mainly handling the CN and RAN. Additionally, another deployment strategy includes another NSSMF handling the TN layer traffic.

Plug and Play (PnP) is a feature of a computer system that allows for the computer system to use a device, function, or software as soon as the device, function, or software is connected to the computer system.

In some embodiments, NSSMF supports multiple CMaaS software development kit (SDK) integrations with northbound CMAAS. Thus NSSMF, with the help from a workflow engine, provides flexibility at the protocol level as well (e.g., REST, NETCONF, GRPC, and the like as well as vendor specific protocol, such as Mavenir, NEC, and the like). In some embodiments, configuration templates support editing static values and updating dynamic parameters.

An SDK is a collection of software development tools in one installable package. An SDK facilitates the creation of applications by having a compiler, debugger and sometimes a software framework. To create applications with advanced functionalities such as push notifications most application software developers use specific software development kits.

A workflow engine is a software application that manages business processes. A workflow engine is a component in workflow technology and typically makes use of a database server. A workflow engine manages and monitors the state of activities in a workflow, such as the processing and approval of a loan application form and determines which new activity to transition to according to defined processes (e.g., workflows). The actions are anything from saving an application form in a document management system to sending a reminder e-mail to users or escalating overdue items to management. A workflow engine facilitates the flow of information, tasks, and events.

FIG. 1 is a diagrammatic representation of a system for network slice design (NSD) 100, in accordance with some embodiments.

NSD system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and network slice module (NSDM) 120.

CN 102 (further known as a backbone) is domain that is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is an access network domain. In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, transport network 106 of NSD system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, base stations are replaced or supplemented with edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultrahigh frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively. UEs 112 have a liquid crystal display (LCD), light-emitting diode (LED) or organic light-emitting diode (OLED) screen interface, such as user interface (UI) 922 (FIG. 9), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

KPI servers 118 produce both predictions and live network data. Live-network data (KPIs, UE/cell/MDT (minimization of drive test) traces, and crowdsourced data) that allows for modelling of network traffic, hot-spot identification, and radio signal propagation. RF drive testing is a method of measuring and assessing the coverage, capacity, and Quality of Service (QoS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber experiences in an area, wireless carriers make directed changes to networks that provide better coverage and service to customers. Drive testing commonly is configured with a mobile vehicle outfitted with drive testing measurement equipment. The equipment is usually highly specialized electronic devices that interface to original equipment manufacturer (OEM) mobile handsets (UEs). This ensures measurements are realistic and comparable to actual user experiences. For mobile networks, crowdsourcing methodology leverages a crowd of participants (e.g., the mobile subscribers) to gather network measurements, either manually or automatically through mobile apps, or directly from the network using call traces.

UE/cell/MDT traces collected at the operations support systems (OSS) or through dedicated tools provide service provider(s) 116 with user-level information. Once geo-located, UE/cell/MDT traces are used to enhance path-loss calculations and prediction plots, as well as to identify and locate problem areas and traffic hotspots. KPI servers 118 allow service provider(s) 116 to use UE/cell/MDT traces along with NSDM 120 for network optimization.

In some embodiments, NSD module 120 is configured to allow a user to design one or more network slices. In some embodiments, the network slice design is GUI based. In some embodiments, operations include a user inputting basic information such as, network slice name, slice type, domains, and shared or non-shared slice selection. Other operations include defining a slice such as, service profile parameters (contains the original requirement of communication-service-instance, such as latency, data-rate, and mobility-level) requested by a northbound interface (e.g., internal to the system or manually from a user) and conversion of service profile parameters to slice profile parameters (contains the slice subnet parameter info of different network domain slice subnet instances (NSSIs), such as RAN, transport network (TN), and CN NSSI).

Figure 2:
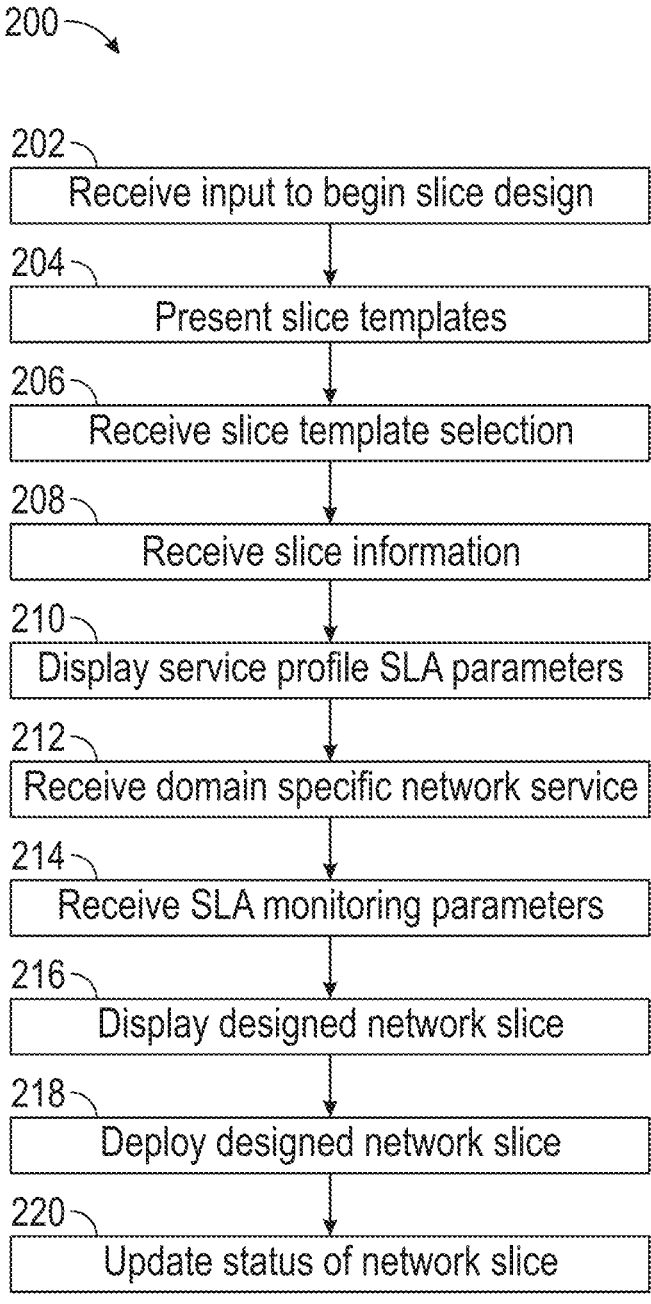
FIG. 2 is a flow diagram of method for designing a network slice, in accordance with some embodiments.

FIG. 2 is a flow diagram for a method of designing a network slice 200, in accordance with some embodiments.

In some embodiments, NSD method 200 describes process tasks of network slice design. While the operations of NSD method 200 are discussed and shown as having a particular order, each operation in NSD method 200 is configured to be performed in any order unless specifically called out otherwise. NSD method 200 is implemented as a set of operations, such as operations 202 through 220.

At operation 202 of NSD method 200, NSDM 120 receives an input from a user to begin network slice design. In some embodiments, the user is presented with a graphical user interface (GUI) indicating a network slice design application is starting. Process flows from operation 202 to operation 204.

The GUI is a form of user interface (UI) that allows users to interact with electronic devices through graphical icons and audio indicators such as primary notation, instead of text-based Uls, typed command labels or text navigation. The actions in a GUI are usually performed through direct manipulation of the graphical elements.

At operation 204 of NSD method 200, NSDM 120 presents, through a GUI, a list of slice templates. In some embodiments, each network slice in a slice template list includes a status (e.g., active, or inactive), a name, a slice service type (e.g., eMBB, uRLLC, mloT, or custom), a service category (such as home automation, high speed train, or the like), a domain (RAN, TN, CN, or E2E), a vendor, version, shared (or not), created date, and last modified date. The term template refers to a feature of a software application that defines a unique non-executable file format intended specifically for that application. Process flows from operation 204 to operation 206.

At operation 206 of NSD method 200, NSDM 120 receives a user input, through the GUI, indicating a selection of a slice template. In some embodiments, a user points to a slice template then clicks on the slice template. In some embodiments, a user clicks on user selection button to begin the process of creating a new slice with the selected slice template. Process flows from operation 206 to operation 208.

At operation 208 of NSD method 200, a GUI is presented, and the user inputs, through the GUI, foundational slice information. In some embodiments, a user inputs a slice name, selects a slice type (e.g., eMBB, URLLC type of slice, or the like), selects domains, and selects whether the slice is shared or dedicated. For example, the user selects a shared or dedicated slice subnet for each domain (RAN, CN, TN, or a combination of each) and coverage area of the network slice. In some embodiments, a public land mobile network (PLMN) selection is based upon the coverage area selected. Process flows from operation 208 to operation 210.

At operation 210 of NSD method 200, a GUI is presented, and the user sets network slice parameters. In some embodiments, at a slice parameter GUI, service profile SLA parameters are presented and configured so the user modifies the parameters as applicable (e.g., according to an SLA). In a non-limiting example, a user modifies an expected latency to fit the specifications of the network slice (e.g., set at 300 ms). In some embodiments, a slice manager calculates slice profile parameters of each domain (RAN, CN, and TN) to meet service profile SLAs. In some embodiments, this process is repeated for each domain. Process flows from operation 210 to operation 212.

At operation 212 of NSD method 200, a GUI is presented, and the user selects a subnet profile, such as an already deployed domain specific network service (a shared network service or a dedicated network service). In some embodiments, the user navigates to slice subnet profile GUI, where the user selects a network slice subnet name for each domain. In some embodiments, a network service associated with the slice subnet is displayed. In some embodiments, in response to a network service being absent or unassociated with the network slice subnet, the user is further able to select a network service template.

In some embodiments, a GUI is presented, and the user is presented with a select network services pop-up box. In some embodiments, in network services box, each of the network services, such as user plane function (UPF is responsible for packet routing and forwarding, packet inspection, quality of service (QoS) handling, and external protocol data unit (PDU) session for interconnecting data network (DN) in a 5G architecture), network repository function (NRF acts as a central services broker for all network functions (NFs) in the 5G Core), or session management function (SMF is responsible for interacting with the decoupled data plane, creating updating and removing PDU sessions and managing session context with the UPF). In a non-limiting example, a user selects UPF (shown as highlighted) and a user is presented with an indication (e.g., true) that the UPF network service is shared. A user selects network services from network services list and a box displays the network functions associated with the selected network services selected by the user from network services list.

Alternatively, a GUI displays NRF as highlighted in network services box and false is the indication presented within shared user input field indicating the NRF network service is not shared. The user inputs network services information in template for a dedicated network service. The user selects a network services template in NS template user selection field. In response to selection of a network service template (e.g., UPF NST), the user is presented with network functions box. In network functions box the user selects a network function (such as UPF app and UPF DB where the user selects the distributed unit type, distributed unit code, and cluster ID).

A GUI is presented after each of the domains (RAN, core, and transport) include a network service. Once each domain includes a network service, NSDM 120 determines whether the selected network services are ready to serve the new network slice.

In some embodiments, a GUI is presented in response to the feasibility test failing for one or more domains (e.g., the RAN domain). In some embodiments, the user selects another slice subnet and rechecks the feasibility.

In some embodiments, a GUI is presented when the feasibility test is successful for each domain. In response to a successful feasibility test, the user deploys the network slice. In some embodiments, without a successful feasibility test, the user is unable to move forward with the network slice design. Process flows from operation 212 to operation 214.

At operation 214 of method 200, a GUI is presented, and the user selects SLA parameters, such as parameters and KPIs, to be monitored for the network slice based on one or more SLA agreements. In some embodiments, a user searches for parameters or KPIs for a selected domain. In some embodiments, the user drags and drops parameters/ KPIs. Further, in response to the slice being deployed and selection of parameters/KPIs to be monitored, the user selects a policy for slice automated healing use-cases. Auto healing is a function that automatically detects disabled access points and restores the wireless network. Process flows from operation 214 to operation 216.

At operation 216 of method 200, a designed network slice is displayed on a GUI for the user's review. In some embodiments, a GUI is displayed with a list of network slices. Process flows from operation 216 to operation 218.

At operation 218 of method 200, a user deploys the designed network slice by clicking on the desired network slice in list of network slices, which displays pop up box. In some embodiments, the slice manager makes an API call to the orchestrator (not shown) and the designed slice is deployed. Process flows from operation 218 to operation 220.

At operation 220 of method 200, the status of the designed slice is updated. In some embodiments, the status of the network slice is updated from designed to deployed. Other statuses include running, activation failed, deployment failed.

Figure 3:
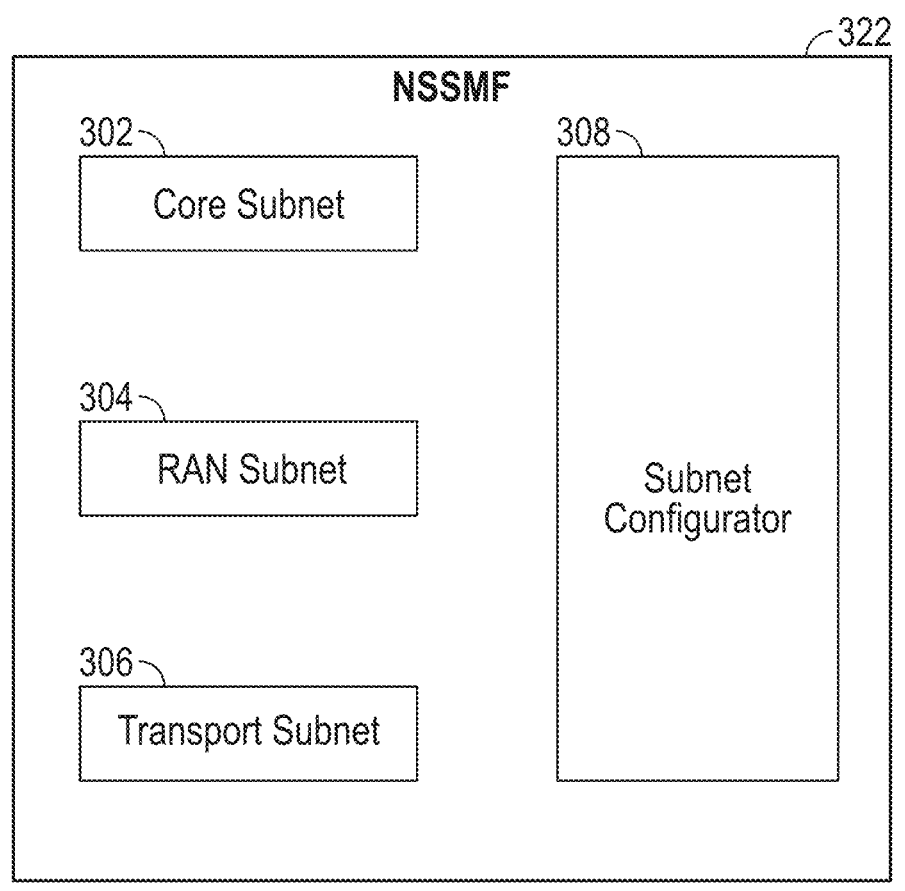
FIG. 3 is a block diagram of a network slice subnet management function (NSSMF), in accordance with some embodiments.

FIG. 3 is a block diagram of a network slice subnet management function (NSSMF) 322, in accordance with some embodiments.

Figure 4:
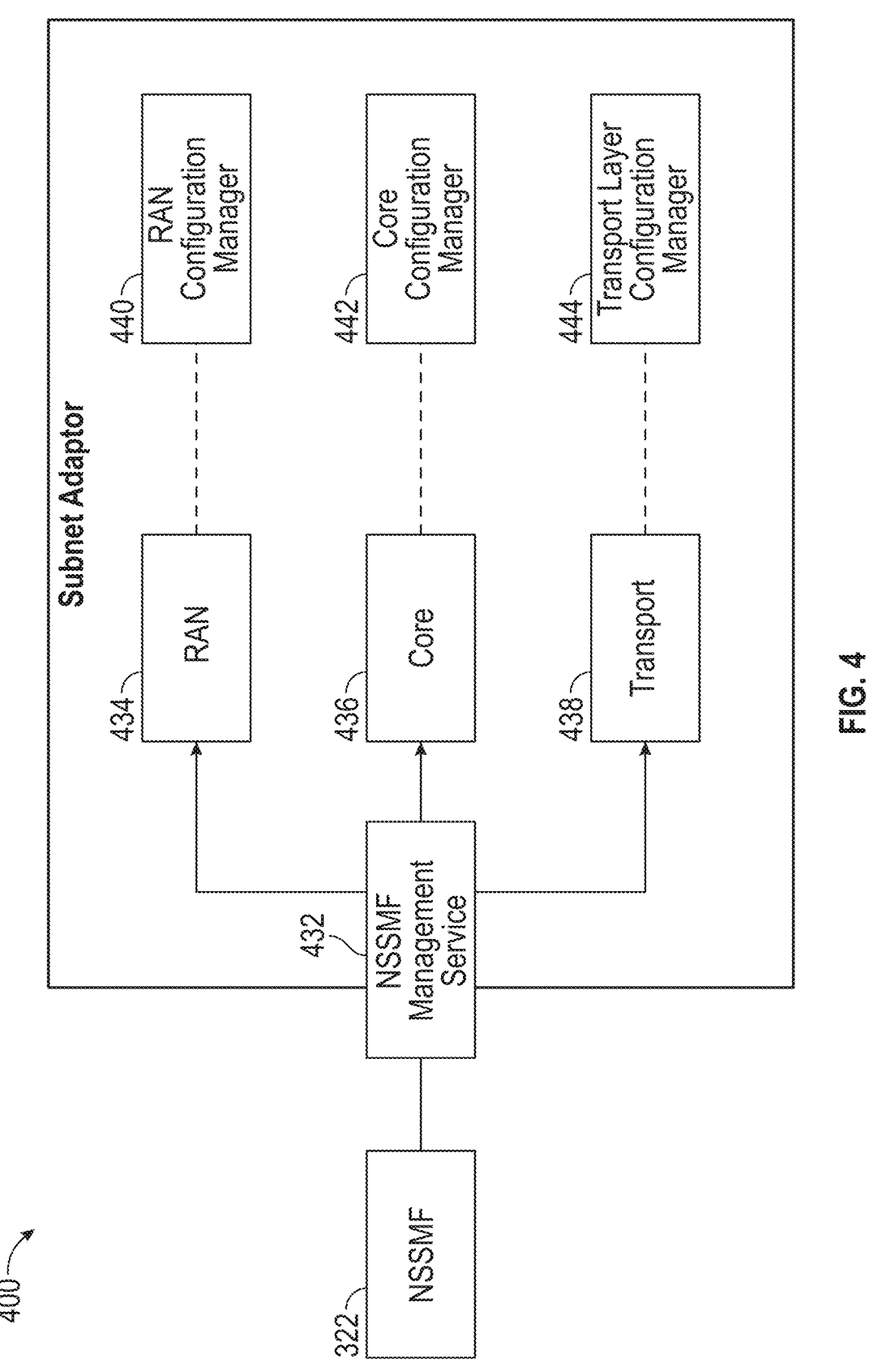
FIG. 4 is a block diagram of a NSSMF, in accordance with some embodiments.

FIG. 4 is a block diagram of a NSSMF 400, in accordance with some embodiments.

FIGS. 3 and 4 are discussed together to provide a better understanding of the NSSMF 322 and the NSSMF system 400.

In FIG. 3, NSSMF 322 includes core subnet 324, RAN subnet 326, transport subnet 328, and subnet configurator 330, which connects to a configuration service, such as NSSMF management service 432 of FIG. 4, to push the configurations to the network services, such as RAN 434, CN 436, and TN 438 of FIG. 4.

Figure 9A:
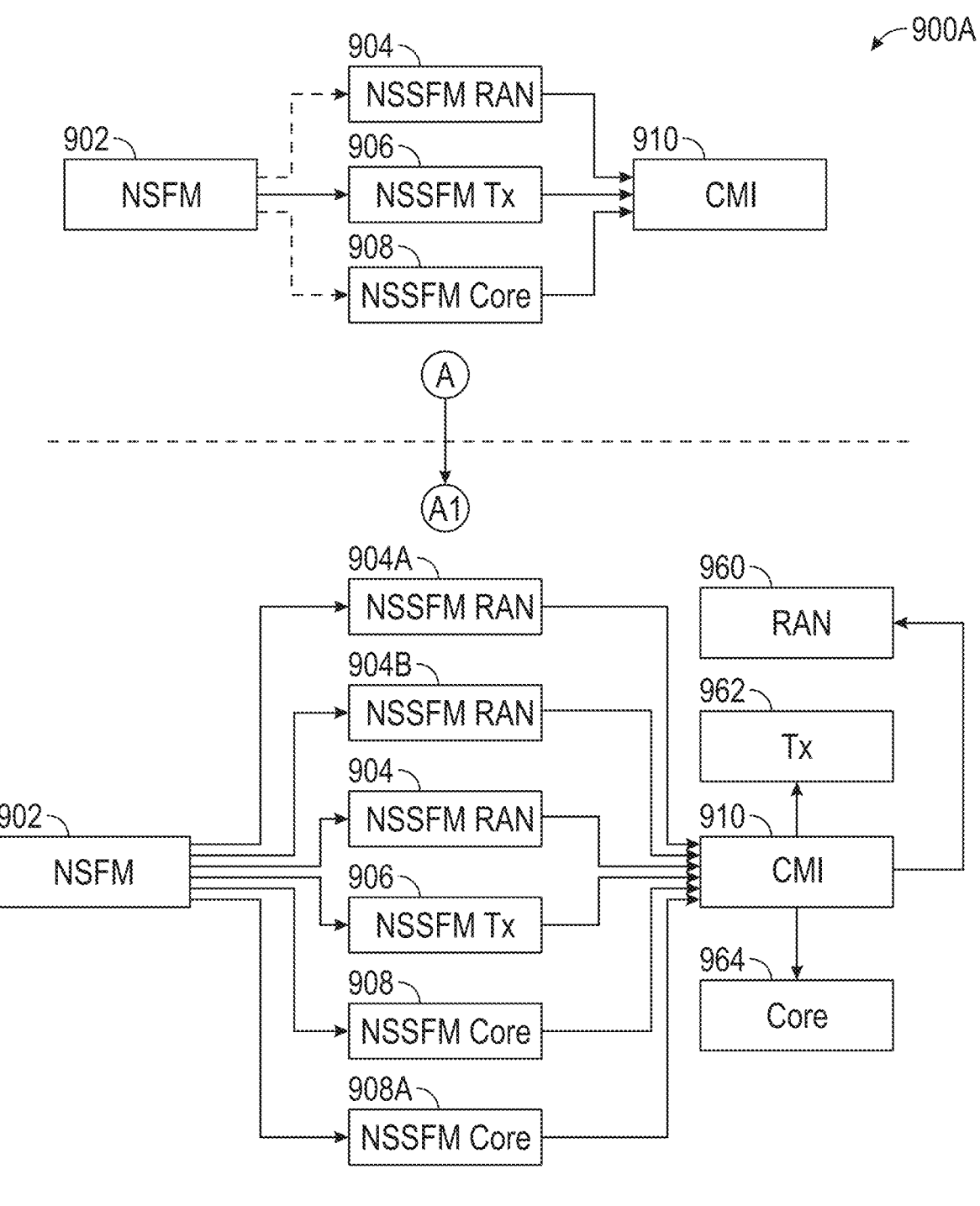
FIGS. 9A and 9B are block diagram of NSSMF systems, in accordance with some embodiments.
Figure 9B:
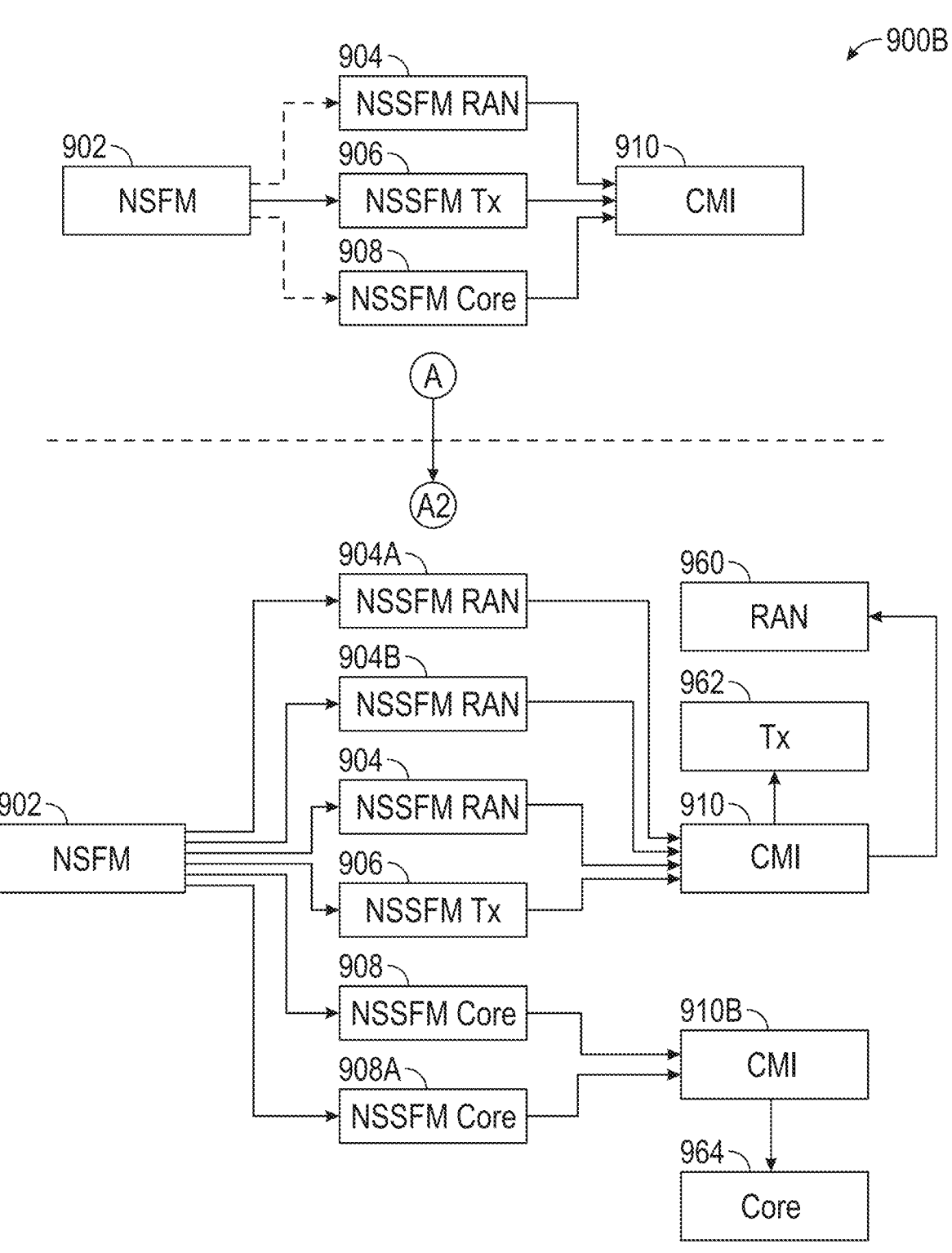

In some embodiments, NSSMF 322 ensures that the behavior of the RAN, such as RAN 104, a CN, such as CN 102, and a TN, such as TN 106 are abstracted and controlled with a NSSMF deployment strategy. In some embodiments, NSSMF 322 operates in several combinations of RAN subnet adaptor 304, CN subnet adaptor 302, or TN subnet adaptor 306, all three together (FIG. 3), or individually (FIGS. 9A & 9B).

NSSMF 322 includes subnet configurator 308, CN subnet 302, RAN subnet 304, and TN subnet 306 that maintain the lifecycle management of each respective subnet. In FIG. 3, a single NSSMF deployment, such as NSSMF 322, manages CN subnet 302, RAN subnet 304, and TN subnet 306 and thus NSSMF 322 is a lifecycle manager for CN subnet 302, RAN subnet 304, and TN subnet 306 included in NSSMF 322.

Subnet configurator 308 assists to generate configuration files and push configuration and connection files to the configuration services which push configuration services and files to network functions. In some embodiments, depending on the vendor, multiple configuration options are supported, and a vendor switches on or off a particular NSSMF function based on load on each network service. In some embodiments, this provides more options for the user/vendor to configure network functions as there are multiple protocols like Netconf, REST, GRPC supported by the network functions and configuration services vary. In some embodiments, this provides flexibility for the user/ vendor to choose between many supported configuration services.

In some embodiments, a configuration service (e.g., a service that sets hardware and software details for network elements to ensure interoperation and communication), such as subnet configurator 308, pushes the network slice subnet configuration to the network services (NSs, such as CN 102, RAN 104, and TN 106). Configuration pushing is where hardware and/or software configuration changes are pushed to southbound layers implementing a desired change until a new configuration push is received.

In FIG. 4, a NSSMF management service 432 receives the subnet configurations, for example from NSSMF 322 (i.e., subnet configurator 308), and distributes the respective subnet configurations to each of RAN 434, core 436, and transport 438.

Each of RAN 434, core 436, and transport 438 are operably coupled to RAN configuration manager, core configuration manager 442, and transport layer configuration manager 444 which generate configuration files, and which pushes configuration files to the network functions. In some embodiments, multiple vender configuration options are supported, and a user/vendor switches on a particular service for a particular configuration push mechanism. Thus, making more options available for the user/vendor to configure network functions as there can be multiple protocols like Netconf, REST, GRPC supported by the network functions. Thus, providing greater flexibility for the user to choose many supported configuration services.

Figure 5:
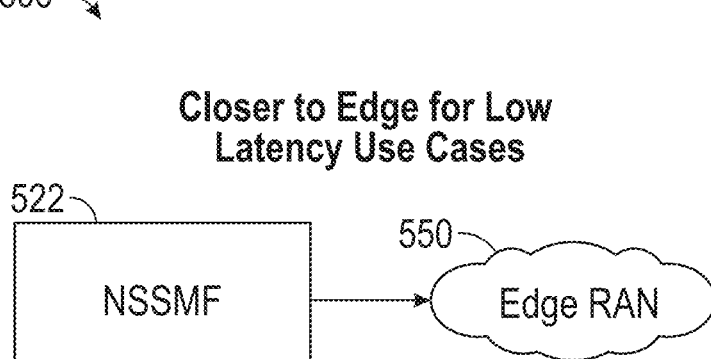
FIG. 5 is a block diagram of an edge NSSMF, in accordance with some embodiments.

FIG. 5 is a block diagram of an edge NSSMF 500, in accordance with some embodiments.

In some embodiments, where there one or more multiple edge RANs 550, each edge RAN 550, is configured with NSSMF 522 near the edge RAN 550 to reduce latency. In this manner, the latency for this configuration is lower, as each NSSMF 522 is closer to edge RAN 550. NSSMF 522 is deployed closer to RAN deployments at the EDGE and handles configurations for those network functions and provides latency advancements in contrast to NSSMFs deployed further away from the RAN deployments, such as edge RAN 550.

In some embodiments, NSSMF 522 is moved from a main data center to a data center near to one or more edge RANs 550. As NSSMF 522 has plug and play capability where each NSSMF 522 is able to be deployed as a single or multi domain subnet configurator.

Figure 6A:
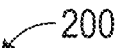
FIG. 6A is a block diagram of a dedicated NSSMF for a Radio Access Network, in accordance with some embodiments.
Figure 6A:
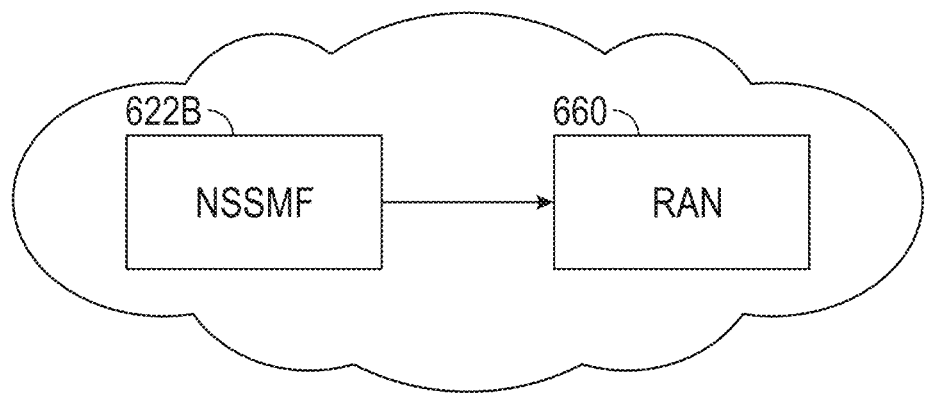

FIG. 6A is a block diagram of a dedicated NSSMF for a Radio Access Network, in accordance with some embodiments.

Figure 6B:
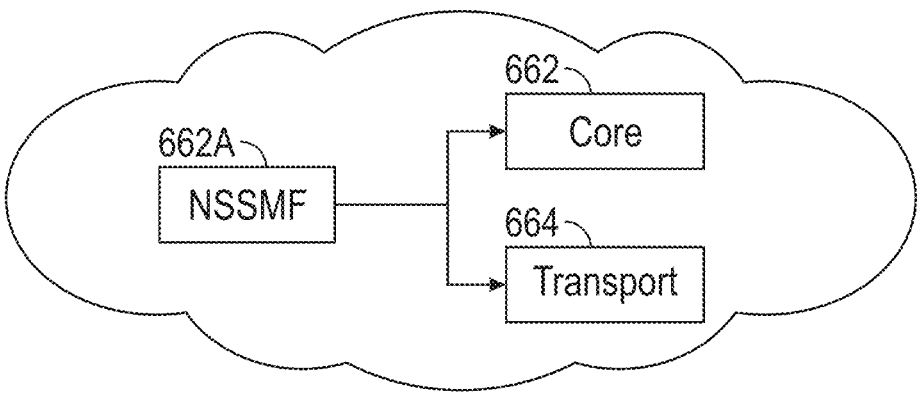
FIG. 6B is a block diagram of a dedicated NSSMF for a core network and transport network, in accordance with some embodiments.

FIG. 6B is a block diagram of a dedicated NSSMF for a core network and transport network, in accordance with some embodiments.

In some embodiments, a cascading deployment is possible where each subnet includes a dedicated NSSMF. In some embodiments, NSSMFs are assigned to subnets based on the subnet load. In FIGS. 5 and 6A, in a non-limiting example, in response to RAN subnet 660 experiencing increasing load over time a user deploys NSSMF 622B for RAN subnet 660 which manages RAN subnet 660. Continuing with the non-limiting example, CN subnet 662 and TN subnet 664 remain with the original NSSMF 662A which originally handled the three subnets together (e.g., RAN subnet 660, core subnet 662 and transport subnet 664). In response, CN subnet 662 and TN subnet 664 processing is improved by the RAN subnet processing being moved over to NSSMF 622B and has increased load processing power with the addition of dedicated NSSMF 662B for RAN subnet 660. In a scenario where dedicated RAN subnet 662B had not been added when RAN subnet 660 was experiencing and increased load over time, then the increased load for RAN subnet 660 slows down the entire processing for each of RAN subnet 660, CN subnet 662, and TN subnet 664. In some embodiments, subnet manager NSSMF 622B is separately deployed and scaled individually, thus resource utilization is dependent on the load of that specific subnet.

In some embodiments, a more distributed network allows the network to handle more load (e.g., bandwidth). This deployment strategy of NSSMFs supporting each of the three subnets (e.g., RAN subnet 660, cores subnet 662, and transport subnet 664), a specific subnet, or groupings of two types of subnets allows the network to handle larger processing loads on each subnet. Thus, the processing of the subnets and the configuration pushing for each subnet is improved substantially.

In some embodiments, each deployment of NSSMF 622B or 622A is of one or more of the following deployment types: one NSSMF for each of CN/RAN/TN (as shown in FIG. 3), CN/RAN, TN/RAN, CN/TN (FIG. 6B), or RAN (FIGS. 5, 6A, 9A, and 9B), TN (FIGS. 9A and 9B), and CN (FIGS. 9A and 9B) individually. In some embodiments, a user/vendor switches to a deployment based on a networks load.

In some embodiments, NSSMF subnet adaptors. 622B and/or 622A are switched on based on deployment and dependent on the slice subnet load on subnet adaptors 660, 662 and/or 664 (e.g., CN-RAN-TN, CN-RAN, TN-RAN, CN-TN or RAN, TN, CN individually). In some embodiments, a user/vendor switches any of the combinations and that deployment is supported; thus, handling greater bandwidth load with increased efficiency (Discussed in greater detail regarding FIGS. 9A and 9B).

Figure 7:
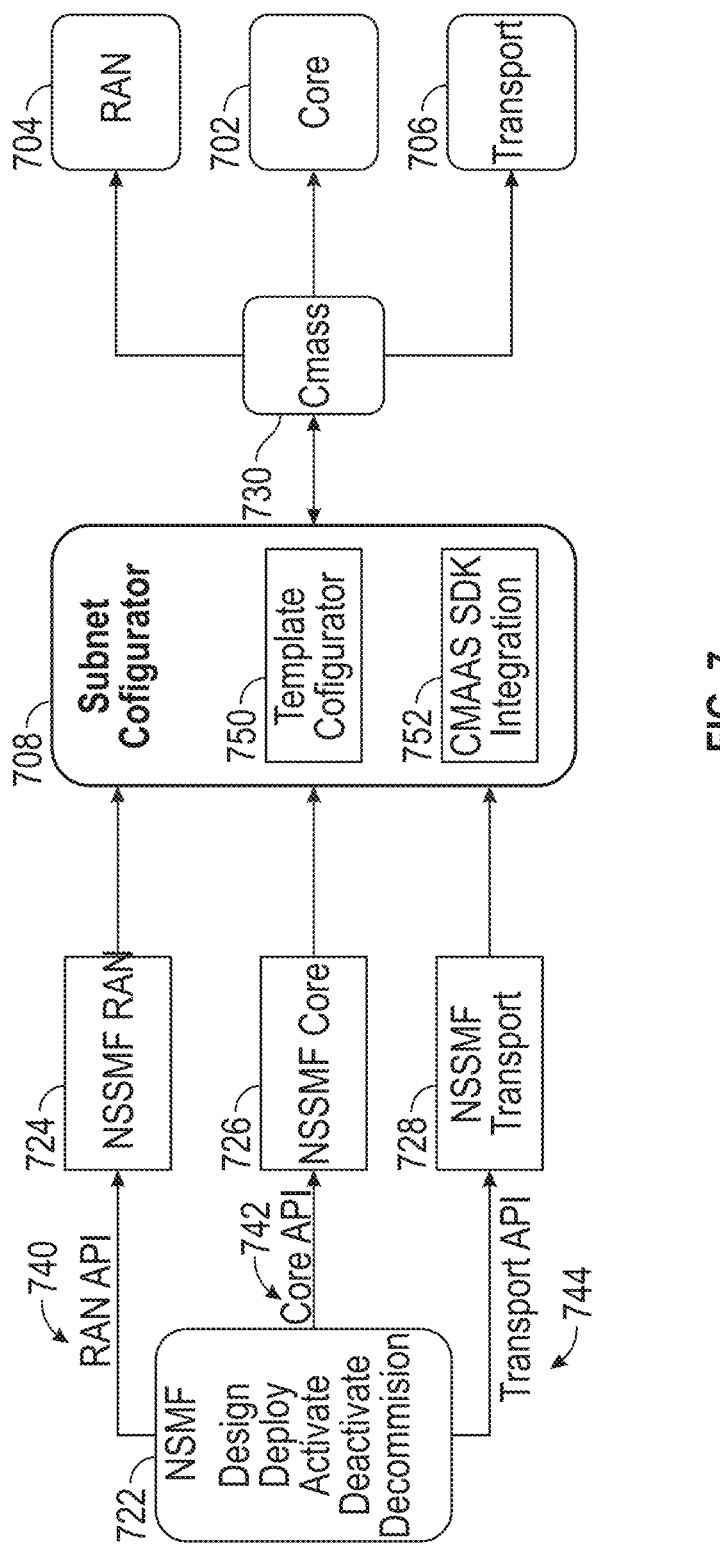
FIG. 7 is a block diagram of a NSSMF function, in accordance with some embodiments.

FIG. 7 is a block diagram of a NSSMF function 700, in accordance with some embodiments.

In some embodiments, network slicing includes a network slice manager function (NSMF) 722 maps services and monitors functionality between layers) and a NSSMF such as NSSMF RAN 724, NSSMF core 726, and NSSMF transport 728. NSSMF function 700 includes a network slice management function (NSMF) 722 that is responsible for subnet design, deployment, activation, deactivation, and decommission of subnet implementations. NSMF sends subnet information to each of NSSMF RAN 724 through RAN API 740, NSSMF core 726 through core API 742, and NSSMF transport 728 through transport API 744.

Each of NSSMF RAN 724, NSSMF core 726, and NSSMF transport 728 forward subnet information to subnet configurator 708. Subnet configurator 708 supports multiple CMAAS SDK integration with north bound CMAAS. Thus, giving flexibility at protocol levels as well (i.e., REST, NETCONF, GRPC), as well as vendor specific (protocol levels such as Mavenir, and NEC). Thus, providing the vendor with greater flexibility with handling processing loads at the RAN, core, and transport level. In some embodiments, this aspect is improved with a workflow engine discussed in detail above.

In some embodiments, use case deployment strategies include moving NSSMF 722 closer to CMaaS deployment locations for RAN 704 and CN 702 for maintaining sessions and reducing latency. In some embodiments, NSSMF 700 is flexible and plug and play capable, as discussed above.

In some embodiments, a NSSMF function 700 includes several components, such as subnet adaptors (e.g., CN 724, RAN 726, and TN 728) and a configuration manager 708 that connects to a configuration service to push network configurations.

In some embodiments, NSSMF function 700 handles higher loads and is capable of being deployed closer to CMaaS 730 near the network functions, which is mainly handling CN 702 and RAN 704. In some embodiments, another deployment strategy includes another NSSMF handling the TN layer traffic. (FIGS. 9A and 9B)

Figure 8:
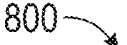
FIG. 8 is a block diagram of a vendor specific subnet configurator abstracted from a NSSMF, in accordance with some embodiments.
Figure 8:
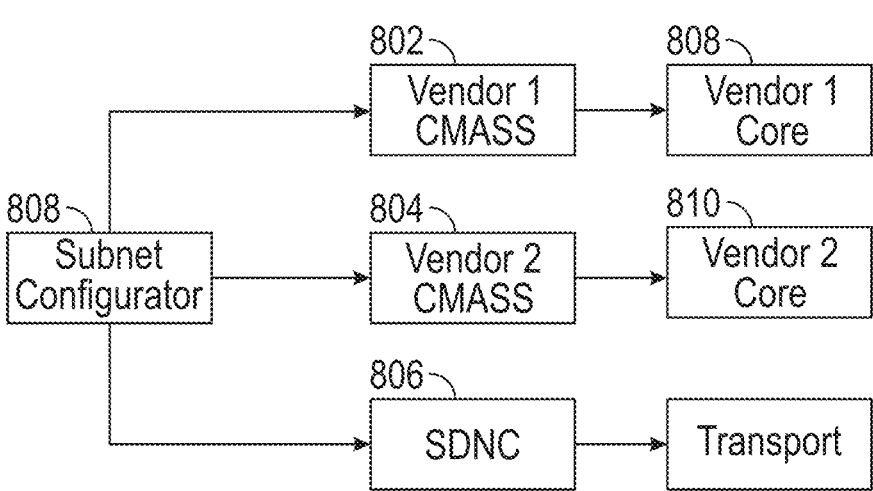

In some embodiments, NSSMF 700 is more compatible with third party vendors for configuration management SDNC integrations (FIG. 8). In some embodiments, deployment strategies are managed, such as how to distribute network slice subnets by the vendor. In some embodiments, subnet configurator 708 includes a template configurator 750 and a CMaaS SDK integration 752. A subnet configurator 708 includes a template configurator 750 and a CMaaS SDK integration 752. In some embodiments, another embodiment of the subnet configurator is a template configurator. In some embodiments, configuration templates are injected, and based on configuration templates, configuration payloads are created.

FIG. 8 is a block diagram of a vendor specific subnet configurator 800 abstracted from a NSSMF, in accordance with some embodiments.

In some embodiments, the subnet layer, vendor 1 CMAAS 802, vendor 2 CMAAS 804/SDNC 806/subnet configuration service 808 are decoupled and provide a vendor, such as vendor 1 core 808, vendor core 2 810 the ability to choose services to be integrated into the NSSMF for configuring the subnet.

In some embodiments, NSSMF is configured with a multi-vendor subnet configuration SPI (SPI is an acronym for cloud service delivery models that are generally of three varieties: Software-as-a-Service (Saas is the capability provided to a user to use the provider's applications running on a cloud infrastructure and accessible from various client devices through either a thin client interface, such as a web browser (e.g., web-based email), or a program interface), Platform-as-a-Service (PaaS is the capability provided to the user to deploy onto the cloud infrastructure user-created or acquired applications created using programming languages, libraries, services, and tools supported by the provider where the user does not manage or control the underlying cloud infrastructure including network, servers, operating systems, or storage, but has control over the deployed applications and possibly configuration settings for the application-hosting environment) and Infrastructure-as-a-Service (IaaS is the capability for the user to deploy and run arbitrary software, which includes operating systems and applications where the user does not manage or control the underlying cloud infrastructure but has control over operating systems, storage, and deployed applications; and possibly limited control of select networking components)).

In some embodiments, NSSMF supports multiple CMaaS software development kit (SDK) integrations with northbound CMAAS. Thus NSSMF, with the help from a workflow engine, provides flexibility at the protocol level as well (e.g., REST, NETCONF, GRPC, and the like as well as vendor specific protocol, such as Mavenir, NEC, and the like). In some embodiments, configuration templates support editing static values and updating dynamic parameters.

In some embodiments, a technical solution is based on scaling, in or out, the load of individual subnets. Thus, maintenance and operation of subnets is more efficient.

In some embodiments, the subnet configurator provides at least three types of integrations (1) CMaaS, (2) SDNC, and (3) CMaaS SDK. In some embodiments, a CMaaS configurator is configured to support multiple CMaaS SDKs that provide integration with northbound systems. This means, in some embodiments, that there are multiple CMaaS, such as a CMaaS for a first vendor and a second CMaaS for a second vendor. Both the first and second vendor have a different CMaaS integration which communicates with the network services. Therefore, in the CMaaS SDK integration in the subnet configurator, a user injects scripts which communicate with each of the two separate CMaaSs through a single NSSMF module. Thus, the subnet configurator supports multi-vendor integration.

In some embodiments, the subnet configurator provides three types of integrations (1) CMaaS, (2) SDNC, and (3) CMaaS SDK. In some embodiments, a CMaaS configurator is configured to support multiple CMaaS SDKs that provide integration with northbound systems. This means, in some embodiments, that there are multiple CMaaS, such as a CMaaS for a first vendor and a second CMaaS for a second vendor. Both the first and second vendor have a different CMaaS integration which communicates with the network services. Therefore, in the CMaaS SDK integration in the subnet configurator, a user injects scripts which communicate with each of the two separate CMaaSs through a single NSSMF module. Thus, the subnet configurator supports multi-vendor integration.

In some embodiments, network distribution strategies involve subnet configuration of the CMaaS. In some embodiments, NSSMF provides network distribution which is more vendor capable.

The multi-vender integration further supports different protocols, or protocols specific to certain vendors. In a non-limiting example, where a single subnet configurator is being used with a CMaaS running one protocol for a first vendor CN, a CMaaS running another protocol for a second vendor CN, and SDNC for a TN, the single subnet configurator is supporting a multi-vendor multi CMaaS client integration, and this is achieved with a different volume engine (e.g., a CMaaS modified through the SDK), where a user injects script to integrate the call flows (e.g., the volume) for the CMaaSs.

In some embodiments, the configuration templates provide flexibility to edit static values, and further update formulas for dynamic parameters. In some embodiments, the static values are changed, and the dynamic formulas, which are created from objects, are further manipulated. In some embodiments, this provides a user flexibility to push varying types of configurations, assists in network scaling, and making subnet manager user friendly.

TABLE 1

| Configuration Parameter Generation for Slice Configuration Configuration Parameter Generation for Slice configuration | | | |
|---|---|---|---|
| Configuration Parameter Types: | | | |
| 1. Static Parameters 2. Dynamic: Parameters:    a. Computed from mathematical operations between attributes    from different slice objects.    b. Static Values that can be directed changed. | | | |
| Current Configuration Parameters: | Slice Profile Object | Service Profile Object | Central Inventory Object |
| key1: JinjaFormula1 | P1 | P'1 | C1 |
| key2: JinjaFormula2 | P2 | P'2 | C2 |
| key3: StaticValue1 | P3 | P'3 | C3 |
| key4: JinjaFormula3 | P4 | P'4 | C4 |
| key5: StaticValue2 | | | |

JinjaFormula1: (P1*P2)/100 + P'1 + C1
User is flexible enough to select select the parameters from object and on runtime edit the jinja file with the latest computation formula using Jinja syntax In some embodiments, the dynamic formulas are mathematical descriptions. In a non-limiting example, in response to having slice profile objects (e.g., P1 and P2) an engineer, at the configuration template modifies the profile object value which is populated and creates the new dynamic parameter. In some embodiments, configuration templates include formulas which are internally used objects. In a non-limiting example of an equation, equation (1) is Jinja Formula 1=(P1·P2)100+P'1+C.

In some embodiments, using the objects (P1, P2, P'1, and C1) an engineer updates the formula using those objects and scale the network. In some embodiments, the formulas are dynamic and based on the vendor's APIs, an engineer manipulates the formulas to scale. In some embodiments, while a configuration template is being pushed, the formulas are unable to be changed. In some embodiments, the vendor or the engineer of the application is unable to change the dynamic parameters on the backend with the configuration template. In some embodiments, in response to an engineer initially loading a configuration template, as part of creating a network slice, the user has the flexibility to update the dynamic formulas as desired.

Thus, in some embodiments, network distribution is based on load and on configuration parameters. Thus, allowing the user flexibility to change configuration parameters, test everything, and integrate multiple CMaaS SDK client integrations or SDNC integrations.

In some embodiments, these two parts (e.g., the CMaaS subnet configurator, included in the NSSMF and life cycle managers which are included in the NSSMF where the entire NSSMF is deployed in multiple locations.

FIGS. 9A and 9B are block diagram of NSSMF systems 900A and 900B, in accordance with some embodiments.

In FIGS. 9A and 9B, a single NSFM 902 is responsible for NSSFM RAN 904, NSSFM 906, and NSSFM 908, which feed into a configuration manager 910.

Figure 10:
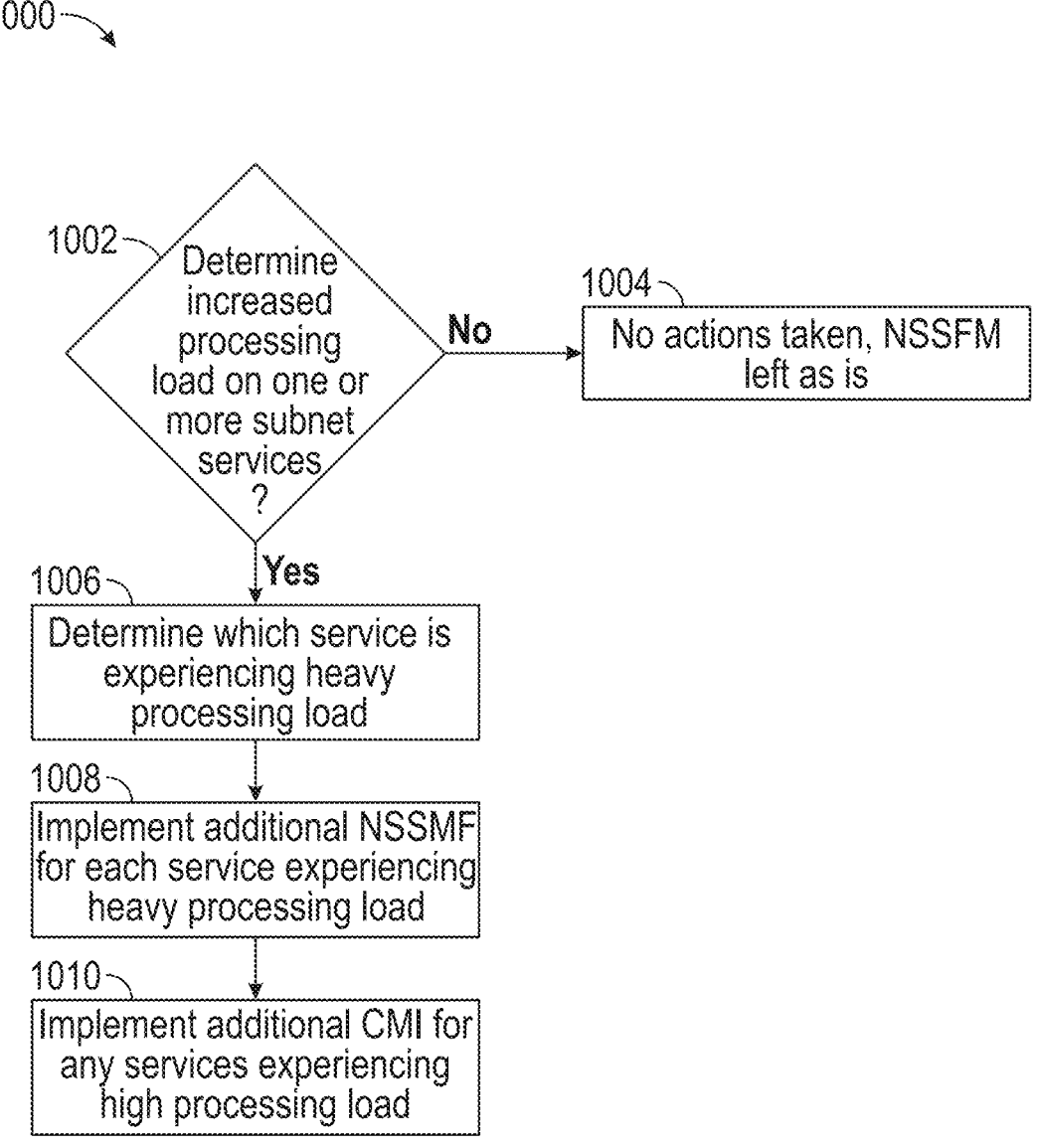
FIG. 10 is a flow diagram of a process for modifying a NSSMF, in accordance with some embodiments.

FIG. 10 is a flow diagram of a method for modifying a NSSMF 1000, in accordance with some embodiments.

FIGS. 9A, 9B, and 10 are discussed together to gain a better understanding of a NSSFM through method for modifying a NSSMF 1000. While the operations method for modifying a NSSMF 1000 are discussed and shown as having a particular order, each operation in method for modifying a NSSMF 1000 is configured to be performed in any order unless specifically called out otherwise, method for modifying a NSSMF 1000 is implemented as a set of operations, such as operations 1002 through 1008.

At operation 1002 of method for modifying a NSSMF 1000, determine an increased processing load above a predetermined amount on ore or more subnet services. In response to the processing load being below the predetermined amount, then operation proceeds to operation 1004 and no actions are taken to introduce one or more NSSFMs at operation 1004. Process terminates at this operation.

At operation 1004 of method for modifying a NSSMF 1000, no actions are taken if no need to for additional processing on either or each together of NSSFM RAN subnet 904, NSSFM core subnet 908, or NSSFM transmission subnet 906. Operation terminates at operation 1004.

At operation 1006 of method for modifying a NSSMF 1000, in response to a determination the increased processing load is above the predeterminer amount, then a determination is made as to which subnet is experiencing a heavier than normal processing load. Process flows from operation 1006 to operation 1008.

At operation 1008 of method for modifying a NSSMF 1000, in response to a heaving than normal processing load on one or more subnet (e.g., NSSFM RAN subnet 904, NSSFM core subnet 908, or NSSFM transmission subnet 906) then additional NSSFM are added, such as NSSFM RANs 904A and 904B and/or NSSFM core 908A. Process flows from operation 1008 to operation At operation 1010 of method for modifying a NSSMF 1000, an additional configuration manager 910B is added for core 964.

Figure 11:
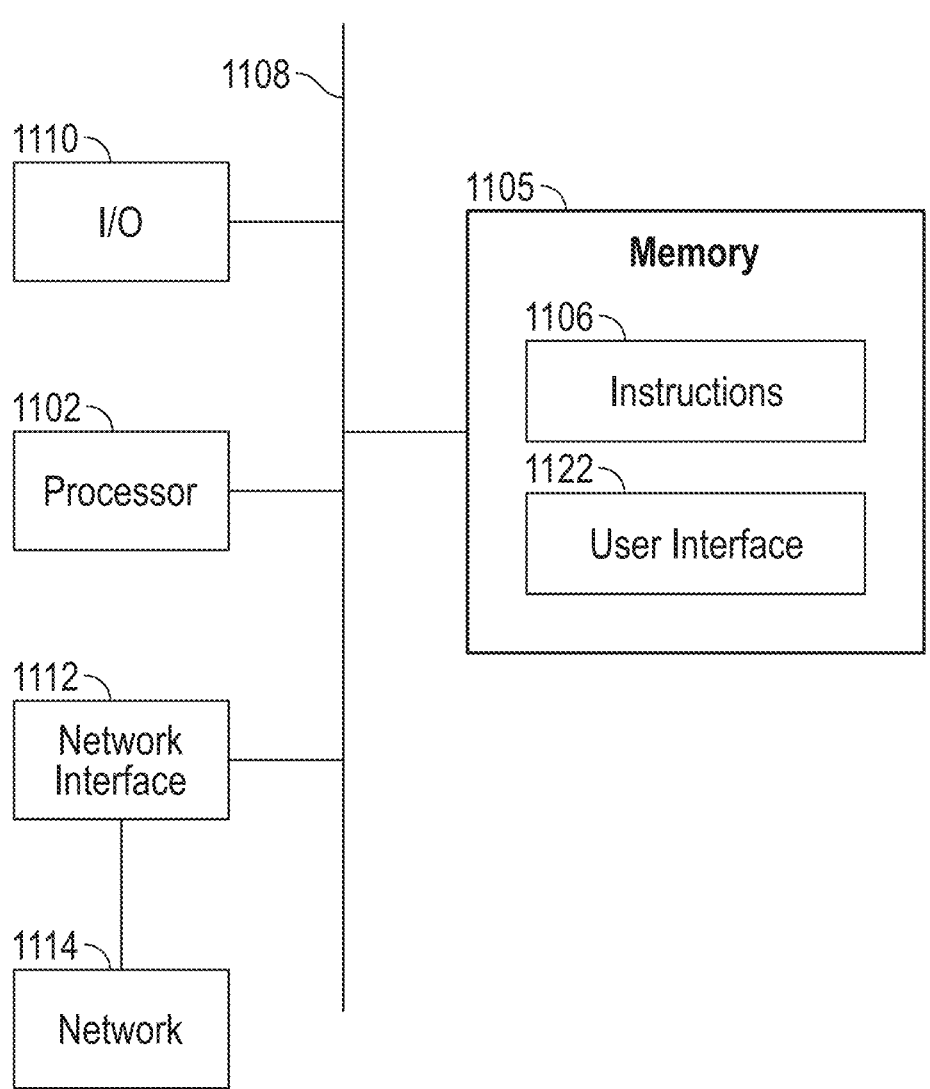
FIG. 11 is a high-level functional block diagram of a processor-based system, in accordance with some embodiments.

FIG. 11 is a block diagram of processing circuitry 1100 in accordance with some embodiments. In some embodiments, processing circuitry 1100 is a general-purpose computing device including a hardware processor 1102 and a non-transitory, computer-readable storage medium 1104. Storage medium 1104, amongst other things, is encoded with, i.e., stores, computer program code 1106, i.e., a set of executable instructions such as an algorithm, or method 200 and 1000. Execution of instructions 1106 by hardware processor 1102 represents (at least in part) a network slice design application which implements a portion, or all the methods described herein in accordance with one or more embodiments (hereinafter, the noted processes and/or methods).

Processor 1102 is electrically coupled to a computer-readable storage medium 1104 via a bus 1108. Processor 1102 is further electrically coupled to an I/O interface 1110 by bus 1108. A network interface 1112 is further electrically connected to processor 1102 via bus 1108. Network interface 1112 is connected to a network 1114, so that processor 1102 and computer-readable storage medium 1104 connect to external elements via network 1114. Processor 1102 is configured to execute computer program code 1106 encoded in computer-readable storage medium 1104 to cause processing circuitry 1100 to be usable for performing a portion or all the noted processes and/or methods. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electro-magnetic, infrared, and/or a semiconductor system (or apparatus or device). For example, computer-readable storage medium 1104 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, storage medium 1104 stores computer program code 1106 configured to cause processing circuitry 1100 to be usable for performing a portion or all the noted processes and/or methods. In one or more embodiments, storage medium 1104 further stores information, such as an algorithm which facilitates performing a portion or all the noted processes and/or methods.

NSD processing circuitry 1100 includes I/O interface 1110. I/O interface 1110 is coupled to external circuitry. In one or more embodiments, I/O interface 1110 includes a keyboard, keypad, mouse, trackball, trackpad, touchscreen, and/or cursor direction keys for communicating information and commands to processor 1102.

Processing circuitry 1100 further includes network interface 1112 coupled to processor 1102. Network interface 1112 allows processing circuitry 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, are implemented in two or more processors 1102.

Processing circuitry 1100 is configured to receive information through I/O interface 1110. The information received through I/O interface 1110 includes one or more of instructions, data, rules, and/or other parameters for processing by processor 1102. The information is transferred to processor 1102 via bus 1108, processing circuitry 1100 is configured to receive information related to UI 1122 through I/O interface 1110. The information is stored in computer-readable medium 1104 as user interface (UI) 1122.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, a method including determining, by a processor, whether a processing load on one or more network slice subnet management functions (NSSMFs) has exceeded a predetermined processing limit; and determining, by the processor, which processing load on the one or more NSSMFs has exceeded the predetermined processing limit; and implementing, by the processor, based on the processing load that exceeded the predetermined processing limit, an additional NSSMF for each NSSMF that exceeded the predetermined processing limit.

In some embodiments, the method further including taking no action, by the processor, in response to the determination neither of one or more NSSMFs has exceeded the predetermined processing limit.

In some embodiments, implementing, by the processor, more than one additional NSSMF to satisfy a processing demand.

In some embodiments, any one of each following combination are satisfied by one or more NSSMEs a first NSSMF for Radio Access Network (RAN), a core Network (CN), and a Transport network (TN); or a second NSSMF for the RAN and the CN and a third NSSMF for the TN; or the third NSSMF for the RAN and the TN and a fourth NSSMF for the CN; or a fifth CN and the TN and a sixth NSSMF for the RAN; or a seventh NSSMF for the RAN; and an eight NSSMF for the CN; and a ninth NSSMF for the TN.

In some embodiments, the method further including implementing, by the processor, a configuration management receiving communication from a core subnet, a RAN subnet, and a transport subnet.

In some embodiments, the method further including distributing, by the processor, subnet communication to one or more of a RAN; a core network; or a transport network.

In some embodiments, the method further including pushing, by the processor, a configuration to push configuration services which pushes a configuration to a network functions.

In some embodiments, the method further including placing, by the processor, a NSSMF close to an edge RAN to reduce latency.

In some embodiments, an apparatus, including a processor; and a memory having instructions stored thereon that, when executed by the processor, cause the apparatus to determine whether a processing load on one or more network slice subnet management functions (NSSMFs) has exceeded a predetermined processing limit; and determine which service has exceeded the predetermined processing limit; and implement an additional NSSMF for each NSSMF that exceeded the predetermined processing limit.

In some embodiments, the apparatus further causes taking no action, by the processor, in response to a determination neither of one or more NSSMFs has exceeded the predetermined processing limit.

In some embodiments, the apparatus further causes implement more than one additional NSSMF to satisfy a processing demand.

In some embodiments, a non-transitory computer readable medium having instructions stored thereon that, when executed by a processor, cause the apparatus to determine whether a processing load on one or more network slice subnet management functions (NSSMFs) has exceeded a predetermined processing limit; and determine which processing load on the one or more NSSMFs has exceeded the predetermined processing limit; and implement, based on the processing load that exceeded the predeterminer processing limit, an additional NSSMF for each NSSMF that exceeded the predetermined processing limit.

In some embodiments, the apparatus further causes implement a configuration management to receive communication from a core subnet, s RAN subnet, and a transport subnet.

In some embodiments, the apparatus further causes distributing subnet communication to one or more of a RAN a core network, or a transport network.

In some embodiments, the apparatus further causes pushing a configuration to push configuration services which pushes a configuration to a network functions.

In some embodiments, the apparatus further causes placing a NSSMF close to an edge RAN to reduce latency.

In some embodiments, a non-transitory computer readable medium having instructions stored thereon that, when executed by a processor, cause the apparatus to determine whether a processing load on one or more network slice subnet management functions (NSSMFs) has exceeded a predetermined processing limit; and determine which service has exceeded the predetermined processing limit; and implement an additional NSSMF for each NSSMF that exceeded the predetermined processing limit.

In some embodiments, the apparatus further causes taking no action, by the processor, in response to a determination neither of one or more NSSMFs has exceeded the predetermined processing limit.

In some embodiments, the apparatus further causes implement more than one additional NSSMF to satisfy a processing demand.

In some embodiments, the apparatus further causes any one of each following combination being satisfied by one or more NSSMFs a first NSSMF for Radio Access Network (RAN), a core Network (CN), and a Transport network (TN); or a second NSSMF for the RAN and the CN and a third NSSMF for the TN; or the third NSSMF for the RAN and the TN and a fourth NSSMF for the CN; or a fifth CN and the TN and a sixth NSSMF for the RAN; or a seventh NSSMF for the RAN; and an eight NSSMF for the CN; and a ninth NSSMF for the TN.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method comprising:
determining, by a processor, whether a processing load on one or more network slice subnet management functions (NSSMFs) has exceeded a predetermined processing limit; and
determining, by the processor, which processing load on the one or more NSSMFs has exceeded the predetermined processing limit; and
implementing, by the processor, based on the processing load that exceeded the predetermined processing limit, an additional NSSMF for each NSSMF that exceeded the predetermined processing limit, wherein: implementing the additional NSSMF comprises:
   deploying the additional NSSMF,
   transferring management of a first subnet from the one or more NSSMFs to the additional NSSMF, and
   maintaining management of a second subnet on the one or more NSSMFs.

2. The method of claim 1, further comprising:
implementing, by the processor, a configuration management receiving communication from a core subnet, a RAN subnet, or a transport subnet.

3. The method of claim 2, further comprising:
distributing, by the processor, subnet communication to one or more of:
   a RAN;
   a core network; or
   a transport network.

4. The method of claim 3, further comprising:
pushing, by the processor, a configuration to push configuration services which pushes a configuration to a network function.

5. The method of claim 4, further comprising:
placing, by the processor, a NSSMF close to an edge RAN to reduce latency.

6. The method of claim 1, further comprising:
taking no action, by the processor, in response to the determination none of the one or more NSSMFs has exceeded the predetermined processing limit.

7. The method of claim 1, wherein the additional NSSMF is different from each of the one or more NSSMF.

8. The method of claim 1, wherein:
any one of each following combination are satisfied by one or more NSSMFs:
   a first NSSMF for Radio Access Network (RAN), a core Network (CN), and a Transport network (TN); or
   a second NSSMF for the RAN and the CN and a third NSSMF for the TN; or
   the third NSSMF for the RAN and the TN and a fourth NSSMF for the CN; or
   a fifth CN and the TN and a sixth NSSMF for the RAN; or
   a seventh NSSMF for the RAN; and
   an eight NSSMF for the CN; and
   a ninth NSSMF for the TN.

9. The method of claim 1, wherein transferring management comprises distribution of processing load of a first subnet between one or more NSSMFs and the additional NSSMF.

10. An apparatus, comprising:
a processor; and
a memory having instructions stored thereon that, when executed by the processor, cause the apparatus to:

determine whether a processing load on one or more network slice subnet management functions (NSSMFs) has exceeded a predetermined processing limit; and
   determine based on the processing load that exceeded the predetermined processing limit, which service has exceeded the predetermined processing limit; and
   implement an additional NSSMF for each NSSMF that exceeded the predetermined processing limit, wherein implementing of the additional NSSMF comprises:
      deploying the additional NSSMF,
      transferring management of a first subnet from the one or more NSSMFs to the additional NSSMF, and
      maintaining management of a second subnet on the one or more NSSMFs.

11. The apparatus of claim 10, wherein the apparatus further causes:
implement a configuration management to receive communication from a core subnet, s RAN subnet, or a transport subnet.

12. The apparatus of claim 11, wherein the apparatus further causes:
distributing subnet communication to one or more of:
   a RAN;
   a core network; or
   a transport network.

13. The apparatus of claim 12, wherein the apparatus further causes:
pushing a configuration to push configuration services which pushes a configuration to a network functions.

14. The apparatus of claim 13, the apparatus further causes:
placing a NSSMF close to an edge RAN to reduce latency.

15. The apparatus of claim 10, wherein the apparatus further causes:
taking no action, by the processor, in response to a determination neither of one or more NSSMFs has exceeded the predetermined processing limit.

16. The apparatus of claim 10, wherein the additional NSSMF is different from each of the one or more NSSMFs.

17. The apparatus of claim 10, wherein the apparatus further causes:
any one of each following combination being satisfied by one or more NSSMFs:
   a first NSSMF for Radio Access Network (RAN), a core Network (CN), and a Transport network (TN); or
   a second NSSMF for the RAN and the CN and a third NSSMF for the TN; or
   the third NSSMF for the RAN and the TN and a fourth NSSMF for the CN; or
   a fifth CN and the TN and a sixth NSSMF for the RAN; or
   a seventh NSSMF for the RAN; and
   an eight NSSMF for the CN; and
   a ninth NSSMF for the TN.

18. A non-transitory computer readable medium having instructions stored thereon that, when executed by a processor, cause the apparatus to:
determine whether a processing load on one or more network slice subnet management functions (NSSMFs) has exceeded a predetermined processing limit; and determine which processing load on the one or more NSSMFs has exceeded the predetermined processing limit; and implement, based on the processing load that exceeded the predeterminer processing limit, an additional NSSMF for each NSSMF that exceeded the predetermined processing limit, wherein implementing of the additional NSSMF comprises:

deploying the additional NSSME, transferring management of a first subnet from the one or more NSSMFs to the additional NSSMF, and maintaining management of a second subnet on the one or more NSSMFs.

19. The non-transitory computer readable medium of claim 18, wherein the apparatus further causes:

taking no action, by the processor, in response to a determination neither of one or more NSSMFs has exceeded the predetermined processing limit.

20. The non-transitory computer readable medium claim 18, wherein the additional NSSMF is different from each of the one or more NSSMFs.

21. The non-transitory computer readable medium of claim 18, wherein the apparatus further causes:

any one of each following combination being satisfied by one or more NSSMFs:

a first NSSMF for Radio Access Network (RAN), a core Network (CN), and a Transport network (TN); or a second NSSMF for the RAN and the CN and a third NSSMF for the TN; or the third NSSMF for the RAN and the TN and a fourth NSSMF for the CN; or a fifth CN and the TN and a sixth NSSMF for the RAN; or a seventh NSSMF for the RAN; and an eight NSSMF for the CN; and a ninth NSSMF for the TN.

* * * * *